UNITED STATES PATENT OFFICE.

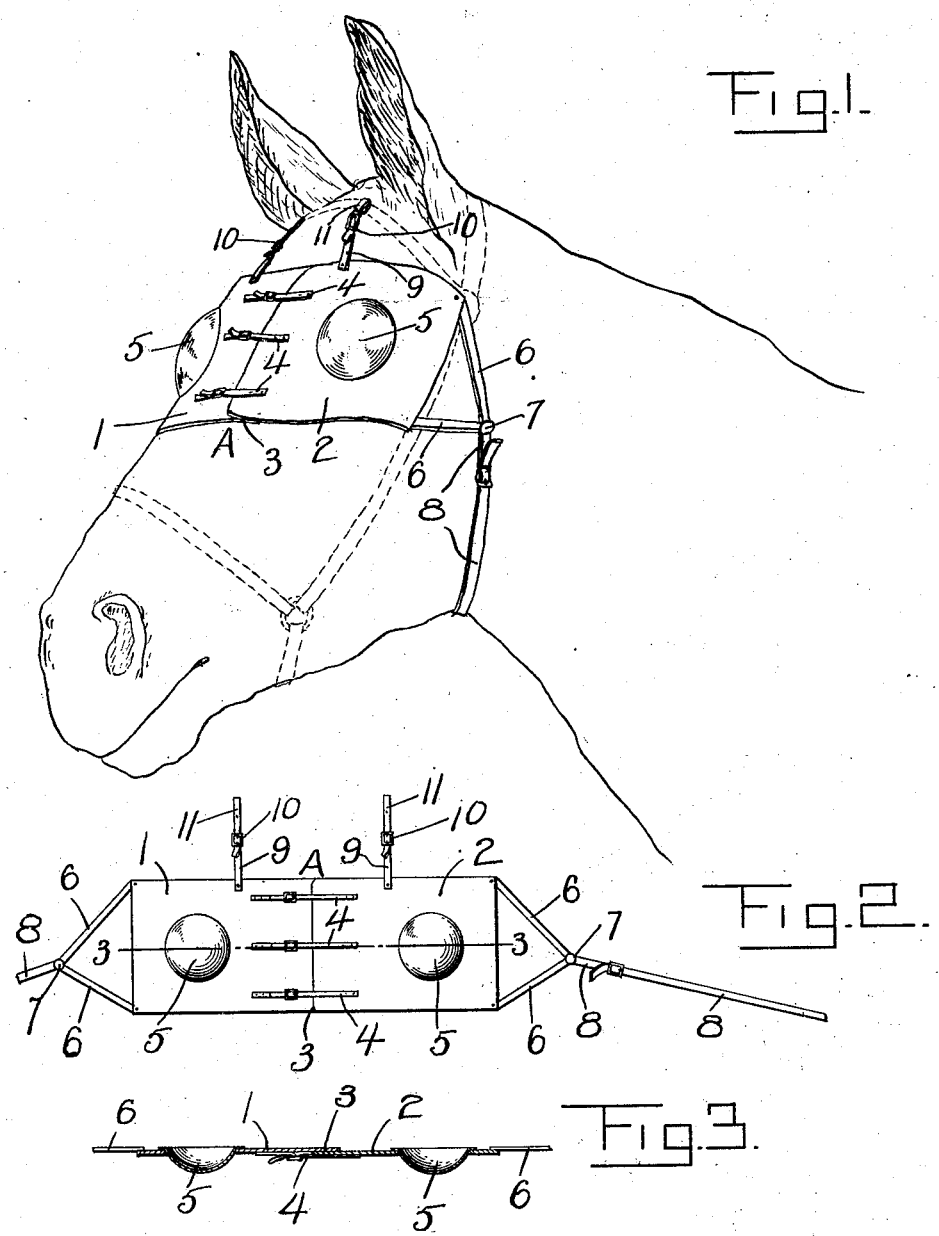

MELVIN M. BOGGS, OF DIXON, NEBRASKA.

GOGGLES FOR HORSES.

No. 888,687.      Specification of Letters Patent.      Patented May 26, 1908.

Application filed March 28, 1907. Serial No. 365,090.

*To all whom it may concern:*

Be it known that I, MELVIN M. BOGGS, a citizen of the United States, residing at Dixon, in the county of Dixon, State of Nebraska, have invented certain new and useful Improvements in Goggles for Horses; and I do hereby declare the following to be a full, clear, and exact description of the invention, such as will enable others skilled in the art to which it appertains to make and use the same.

This invention has relation to devices for protecting the eyes of horses from injury from dust, cinders, knats, and dirt, and in this way relieving the animal of much pain and annoyance and making its service more satisfactory and valuable.

It is the object of the invention to provide goggles that will completely shut out dust, gnats, flying cinders and the like, and that may be readily attached to the headstall or bridle and adjusted to fit directly over the eyes of the animal.

The nature of the invention is fully and clearly ascertained from the device portrayed in the annexed drawings, forming a part of this specification, in view of which it will first be described with respect to its construction and mode of use, and then be pointed out in the subjoined claims.

Of the said drawings—Figure 1 is a view of the head of the horse with my improvement thereon. Fig. 2 is a front view of the invention detached and spread out flat. Fig. 3 is a sectional view in the plane 3 3, Fig. 2.

Similar numerals of reference designate similar parts or features, as the case may be, wherever they occur.

In the drawings A designates a band of thin leather or other suitable flexible material of, say, for mere example, six inches wide and eighteen inches in length, suitable for extension across the front of the head of a horse and along the sides over the temples. The said band is composed of two parts— that is, it is divided centrally and the inner ends 1 and 2 of the two parts are overlapped, as at 3, and adjustably joined by straps and buckles 4 along a line that will fall on the forehead substantially midway between the eyes of the horse.

Holes are formed in each part 1 and 2, at points in the band that will come opposite the eyes, when it is in place, and pieces of isinglass 5 are cemented or otherwise secured at their edges to the fabric so as to cover said holes, forming goggles through which the animal can see, and that will effectually shut out dust, cinders and the like, that may be blown about by the wind, from getting into the animal's eyes.

6 6 designate straps that are connected with the upper and lower corners of the band A at the outer ends, which straps converge at 7, and are connected at their convergent points on each side with what is practically a throat-latch, 8, the said straps 8 being provided with buckling means so that their ends may be connected under the animal's jaw.

9 9 designate straps, connected at their lower ends with the upper margins of the two parts 1 and 2, of the band A and provided on their free ends with buckles 10 by which they are adjustably connected with the free ends of strap 11 11 that are attached at their other ends to the brow-band of the head-stall.

The straps 4 permit of the adjustment of the two parts 1 and 2 of the band A so that the glasses 5 may fit over the eyes of the horse to which the goggles are applied, whatever may be the size of its head; and the adjustability of the straps 9 with respect to the straps 11 is for a similar purpose—that is, to raise or lower the goggles on the forehead.

It will be noticed by reference to Fig. 3 that the glasses 5 in front of the animal's eyes, are bulged outward or forward from their edges to their centers. This construction being for the purpose of keeping the said glasses from being brought against the animal's eyes, as might be the case if they were made flat.

The simplicity and efficiency of the device as well as the readiness with which it may be adjusted is obvious.

I have found isinglass to suit the purpose for which it is represented to be herein used better than fine-woven wire or common glass, in that it completely shuts out dust, etc., and is not liable to break and is practically transparent. Moreover, the broad head-band, composed as described, is essential to the invention in order to shut out dust, smoke, etc. If the glasses of the head-band had no marginal extensions around the same, dust, dirt and smoke would be quite liable to get into the eyes of the animal. Again, by providing a broad head-band extending across the face on lines well above and below the eyes and constructing and equipping the same, as described and shown, the goggles can be adjusted with the utmost nicety and be readily held in position of the adjustment.

What is claimed is—

Goggles for horses comprising a broad head-band of thin leather extending on parallel lines across the face between lines well above and below the eyes and overlapping the animal's temples, composed of two parts, overlapped along the central portion between the eyes, the said overlapped parts being provided with straps and buckles to adjust the same, each part having holes made therein and outwardly-bulged isinglass coverings to said holes, straps at the outer edge of each part convergently connected with the throat-latch, and vertically extended and adjustable straps connected with the brow-band of the head-stall and with the upper edge of the head-band.

In testimony whereof, I affix my signature, in presence of two witnesses.

MELVIN M. BOGGS.

Witnesses:
    ED O'FLAHERTY,
    J. SULLIVAN.